United States Patent
Tsutsumoto et al.

(10) Patent No.: US 7,219,493 B2
(45) Date of Patent: May 22, 2007

(54) FILTER REGENERATION IN ENGINE EXHAUST GAS PURIFICATION DEVICE

(75) Inventors: Naoya Tsutsumoto, Yokohama (JP);
Junichi Kawashima, Yokosuka (JP);
Makoto Otake, Yokohama (JP);
Terunori Kondou, Yokohama (JP);
Takao Inoue, Yokohama (JP);
Toshimasa Koga, Yokohama (JP);
Shouichirou Ueno, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 76 days.

(21) Appl. No.: 10/937,272

(22) Filed: Sep. 10, 2004

(65) Prior Publication Data

US 2005/0060991 A1 Mar. 24, 2005

(30) Foreign Application Priority Data

Sep. 19, 2003 (JP) ............................. 2003-328739

(51) Int. Cl.
*F01N 3/00* (2006.01)
*F01N 3/02* (2006.01)
(52) U.S. Cl. ..................... 60/297; 60/311; 60/286; 60/287; 60/295; 60/296
(58) Field of Classification Search ............... 60/286, 60/287, 295, 297, 311
See application file for complete search history.

(56) References Cited

U.S. PATENT DOCUMENTS

| 4,462,208 | A | * | 7/1984 | Hicks et al. | ............... | 60/286 |
| 4,747,264 | A | * | 5/1988 | Santiago et al. | ............. | 60/274 |
| 6,253,543 | B1 | * | 7/2001 | Russell | ........................ | 60/274 |
| 6,422,001 | B1 | * | 7/2002 | Sherman et al. | .............. | 60/274 |

(Continued)

FOREIGN PATENT DOCUMENTS

EP 1 304 458 A1 4/2003

(Continued)

OTHER PUBLICATIONS

U.S. Appl. No. 10/937,271, filed Sep. 10, 2004, Ueno et al.

(Continued)

*Primary Examiner*—Thomas Denion
*Assistant Examiner*—Loren Edwards
(74) *Attorney, Agent, or Firm*—Foley & Lardner LLP

(57) ABSTRACT

A regeneration control device which regenerates a filter (13) by increasing an exhaust gas temperature to burn exhaust gas particulates trapped in the filter, is disclosed. The filter (13) traps particulate matter in exhaust gas from an engine (1). The regeneration control device suppresses fuel cost-performance impairment due to filter regeneration. The regeneration control device has a load detection sensor (31) which detects an engine load and a microcomputer-based controller (22). The controller is programmed to perform engine control to adjust the exhaust gas temperature for regeneration of the filter (13), when a computed trapped amount is equal to or more than the first reference value (A) and less than the second reference value (B), and the detected load (Vsp) is equal to or more than a reference load (Vo); and perform engine control to adjust the exhaust gas temperature for regeneration of the filter (13) regardless of the detected load (Vsp), when the computed trapped amount is equal to or more than the second reference value (B).

8 Claims, 3 Drawing Sheets

U.S. PATENT DOCUMENTS

| | | | |
|---|---|---|---|
| 6,843,055 B2 * | 1/2005 | Ootake | 60/297 |
| 2003/0144773 A1 * | 7/2003 | Sumitomo | 701/22 |
| 2004/0055279 A1 * | 3/2004 | Plote et al. | 60/274 |

FOREIGN PATENT DOCUMENTS

| | | |
|---|---|---|
| EP | 1 455 570 A2 | 9/2004 |
| WO | WO 97/16632 A1 | 5/1997 |
| WO | WO 02/38932 A1 | 5/2002 |
| WO | WO 02/38933 A1 | 5/2002 |

OTHER PUBLICATIONS

U.S. Appl. No. 10/942,010, filed Sep. 16, 2004, Otake et al.

U.S. Appl. No. 10/942,009, filed Sep. 16, 2004, Kondou et al.

* cited by examiner

FILTER REGENERATION IN ENGINE EXHAUST GAS PURIFICATION DEVICE

FIELD OF THE INVENTION

This invention relates to an engine exhaust gas purification device, and more particularly to a technique for regeneration processing of a filter which traps particulate matter in engine exhaust gas.

BACKGROUND OF THE INVENTION

An engine exhaust gas purification device disclosed in WO97/16632 comprises a filter in an engine exhaust gas system for trapping particulate matter (hereafter, "exhaust gas particulates") discharged from a diesel engine or the like, wherein the filter is regenerated by oxidizing or burning the trapped particulates at a predetermined interval. To regenerate the filter, this device raises the exhaust gas temperature by engine control by retarding the fuel injection timing or performing a second injection in addition to a main injection.

SUMMARY OF THE INVENTION

This prior art filter regeneration device starts regeneration when the particulates in the exhaust gas trapped by the filter have reached a permitted limiting amount. Therefore, in the engine running state when regeneration is starting or being performed, a large amount of fuel is required to raise the exhaust gas temperature and this worsens fuel cost-performance.

It is therefore an object of this invention to provide a regeneration control device which suppresses fuel cost-performance impairment due to filter regeneration.

In order to achieve the above object, this invention provides a regeneration control device which regenerates a filter for trapping particulate matter in exhaust gas from an engine, the regeneration control device burning the particulate matter trapped in the filter by raising an exhaust gas temperature, the regeneration control device comprising a load detection sensor which detects an engine load, and a microcomputer. The microcomputer is programmed to compute a trapped amount of particulate matter trapped by the filter based on an engine running state including an engine load; compare the computed trapped amount with a first reference value and second reference value; perform engine control to adjust the exhaust gas temperature for regeneration of the filter, when the computed trapped amount is equal to or more than the first reference value and less than the second reference value, and the detected load is equal to or more than a reference load; and perform engine control to adjust the exhaust gas temperature for regeneration of the filter regardless of the detected load, when the computed trapped amount is equal to or more than the second reference value.

The details as well as other features and advantages of this invention are set forth in the remainder of the specification and are shown in the accompanying drawings.

DESCRIPTION OF THE PREFERRED EMBODIMENTS

Figure 1:
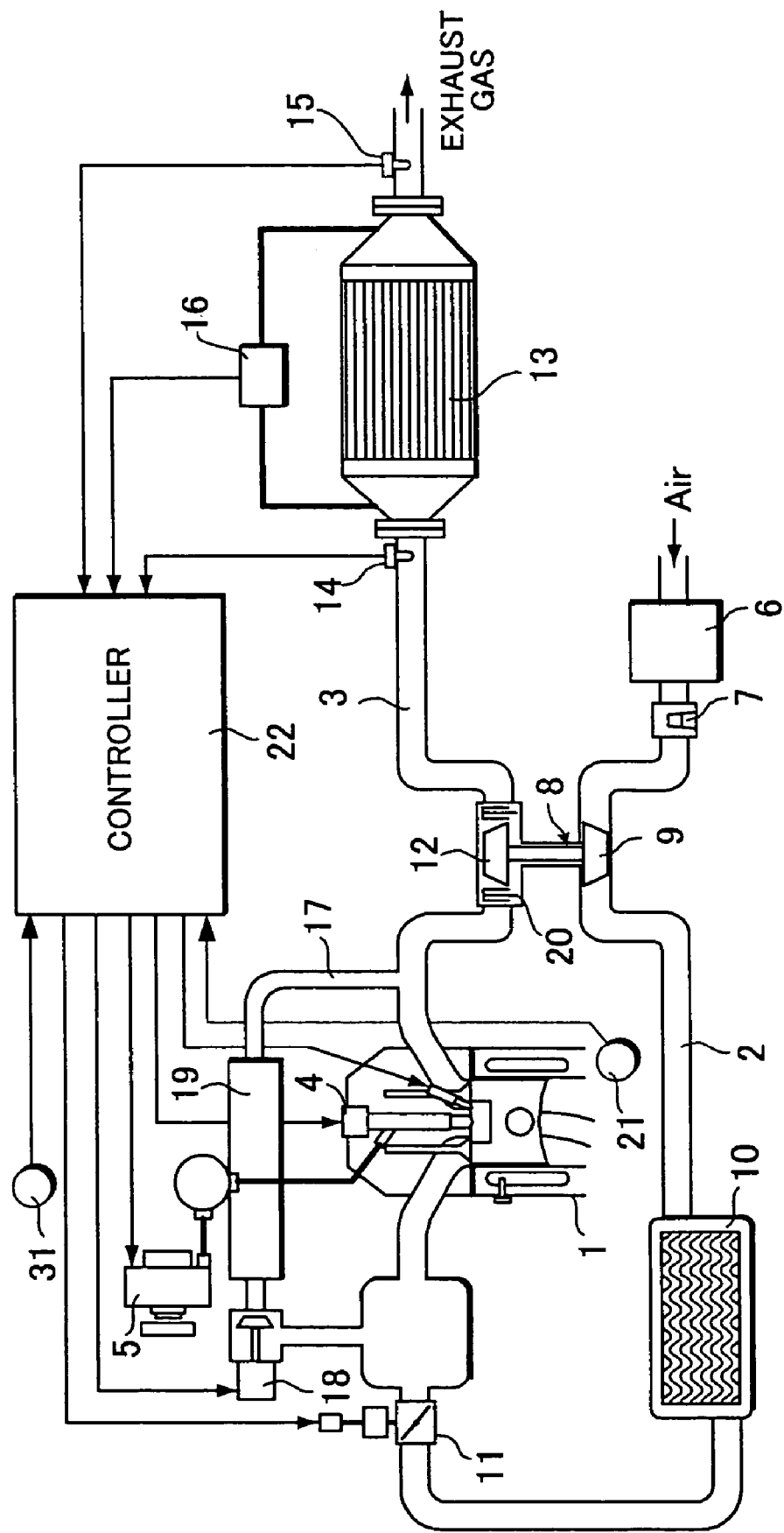
FIG. 1 is a schematic view of an engine system to which this invention can be applied.

Referring to FIG. 1, an engine system to which this invention can be applied comprises an engine body 1, an intake passage 2 and an exhaust passage 3. A fuel injector 4 and fuel injection pump 5 are attached to the engine body 1. In this specification, the engine body 1 and fuel injector 4 may be collectively referred to as the engine. An air cleaner 6, airflow meter 7, compressor 9 of an exhaust gas turbocharger 8, intercooler 10 and throttle valve 11 are installed in the intake passage 2 from the upstream side. A turbine 12 of the exhaust gas turbocharger 8 and a filter 13 which traps exhaust gas particulates are installed in the exhaust passage 3 from the upstream side. The filter 13 is a diesel particulate filter (DPF) for a diesel engine.

A temperature sensor 14 measures the inlet temperature of the filter 13. A temperature sensor 15 measures the outlet temperature of the filter 13. A differential pressure sensor 16 detects the differential pressure of the filter 13. An EGR (exhaust gas recirculation) passage 17 connects the intake passage 2 and exhaust passage 3. An EGR valve 18 and EGR cooler 19 are installed in the middle of the EGR passage. The exhaust gas turbocharger 8 is provided with a variable nozzle 20 which can adjust the flow rate of the exhaust gas flowing into the turbine 12. A crank angle sensor 21 detects an engine rotation speed and a crank position. In addition, the engine system is provided with various auxiliary devices.

A microcomputer-based controller 22 comprises a microcomputer comprising a central processing unit, ROM (read only memory), random access memory (RAM) and an input/output interface (I/O interface). Based on signals from the above mentioned sensors, the controller 22 controls one or more of a fuel injection timing, injection amount, opening of the throttle valve 11, EGR amount, opening of the variable nozzle 20 and load of auxiliary devices, and increases/adjusts the exhaust gas temperature by this engine control.

The controller 22 functions as part of a regeneration control device which adjusts the exhaust gas temperature by engine control, and a computing device. The engine functions as a heat generating device which burns particulate matter by increasing the bed temperature of the filter, in order to regenerate the filter.

An outline of the regeneration control performed by the controller 22 is as follows.

The controller 22 continually detects a load Q and rotation speed Ne in the background as an engine running state while performing the regeneration control, and computes an amount of particulates trapped in the filter (particulate trapped amount) using the load Q and rotation speed Ne.

As a typical value of the load Q, a fuel injection amount command value of the controller 22 is used, and as the rotation speed Ne, the signal of a crank angle sensor 21 is read. If the engine system is provided with a fuel injection amount detection sensor which detects the fuel injection amount, the controller 22 may read the fuel injection amount as a load Q from the fuel injection amount detection sensor.

Various techniques for computing the particulate trapped amount in the filter are known. An example of a computation technique is shown below: A table which determines the discharge rate (discharge amount in a fixed interval) of the particulates discharged from the engine according to the load Q and rotation speed Ne is experimentally drawn up beforehand, and is stored in the ROM of the controller 22. The controller 22 computes a particulate trapped amount by integrating the read discharge rate at every fixed interval. Otherwise, the controller 22 computes a particulate trapped amount based on the aforesaid engine running state signal and a signal from a differential pressure sensor 16.

As described later, when the relation between the trapped amount of exhaust gas particulates and engine load satisfies a predetermined condition, the controller 22 performs filter regeneration. In the engine system shown in FIG. 1, engine control for regeneration of the filter is performed, for example by throttling intake air by a throttle valve 11, retarding the fuel injection timing, performing a secondary injection, decreasing the EGR amount or controlling the opening of a variable nozzle 20. An exhaust gas temperature of 300 degrees C. or more required for particulate regeneration is ensured by the engine control.

Referring to the flowchart of FIG. 2, a first aspect of the control routine relating to filter regeneration performed by the controller 22 will be described. This control routine is executed periodically, for example by a timer interrupt at a fixed interval (e.g., 10 ms).

First, in a step S101, a trapped amount PM of exhaust gas particulates in an engine running state where regeneration is not being performed, is computed by the aforesaid method.

Next, in a step S102, the computed trapped amount PM is compared with a first reference value A and a second reference value B. The first reference value A is set to be smaller than the second reference value B. The second reference value B is set to be in the vicinity of the permitted maximum trapped amount determined by the characteristics of the engine system and filter.

In the comparison of the step S102, if PM<A, it is considered that the trapped amount PM has not reached the level required for regeneration, so the present routine is terminated without performing regeneration processing.

If A≦PM<B, the routine proceeds to a step S103 where the engine load Q is computed. Here, the vehicle speed Vsp of the vehicle in which the engine system of FIG. 1 is installed, is detected as a load Q. The vehicle speed Vsp of the vehicle may be detected by a vehicle speed sensor 31 or calculated from a signal from the crank angle sensor 21.

Next, in a step S104, it is determined whether the vehicle speed Vsp is equal to or greater than a reference value Vo. Only when the detected vehicle speed Vsp is equal to or greater than the reference value Vo (i.e. the vehicle is running at high speed), the routine proceeds to a step S105 and regeneration processing is then performed. If the vehicle speed Vsp is equal to the reference value Vo, it means that the load Q is a reference load Qo. The reference value Vo (for example 30–50 km/hour) is a vehicle speed below which it is determined that the vehicle is travelling in an urban area. Further, the amount of fuel injected to the engine may represent the load. A fuel injection amount detection sensor may detect the fuel injection amount, and the controller 22 may read the fuel injection amount from the fuel injection amount detection sensor.

In the step S105, regeneration is performed by increasing/adjusting the exhaust gas temperature.

Next, in a step S106, the particulate trapped amount PM in the filter which is being regenerated, is computed. The amount of exhaust gas particulates removed/burnt during regeneration can be calculated by known methods. The calculation may be performed by using a relation between the regeneration temperature of the filter and regeneration time, or the amount of exhaust gas particulates removed may be calculated by referring to a map previously drawn up to give the removed amount according to the engine running state. The regeneration temperature means the temperature of the filter in regeneration.

The present trapped amount (exhaust gas particulate amount remaining in the filter) is computed by progressively subtracting the removed amount from the trapped amount when regeneration starts.

In a step S107, it is determined whether or not the trapped amount PM has reached a predetermined value of zero, i.e., whether or not a full regeneration has been performed. When PM=0, the routine proceeds to a step S108 and regeneration is terminated. When PM>0, the routine returns to the step S104, and regeneration is continued until PM=0. However, the vehicle speed is determined in the step S104, and when the vehicle speed Vsp during regeneration has fallen below the reference value Vo, regeneration is stopped.

On the other hand, if it is determined in the step S102 that PM>B, the routine proceeds to a step S109, and regeneration is performed regardless of the engine load.

Next, in a step S10, the trapped amount PM is computed in an identical way to that of the step S106.

Next, in a step S111, the trapped amount PM is compared with a third reference value C. The third reference value C is set to the first reference value A or a higher value than the first reference value A. If the trapped amount PM is larger than the reference amount C, the routine returns to the step S109 and regeneration processing is continued. If the engine reaches a predetermined low load running state including idle running during regeneration processing, regeneration processing may be stopped.

According to the aforesaid regeneration control, in a relatively low load running state where the vehicle speed is less than the reference value Vo, regeneration is not started until the trapped amount of particulates in the exhaust gas is equal to or greater than the second reference value B corresponding to the permitted maximum value. On the other hand, if the trapped amount is equal to or greater than the first reference value A, even if it is less than the second reference value B, regeneration is performed in a relatively high load running state where the vehicle speed is equal to or greater than the reference value Vo. Therefore, in a relatively low load running state where fuel cost-performance is impaired due to regeneration, the regeneration opportunities are reduced, and in addition the particulate trapped amount in the filter can continually be suppressed low by using a relatively high load running state where the exhaust gas temperature required for regeneration is efficiently obtained.

Figure 3:
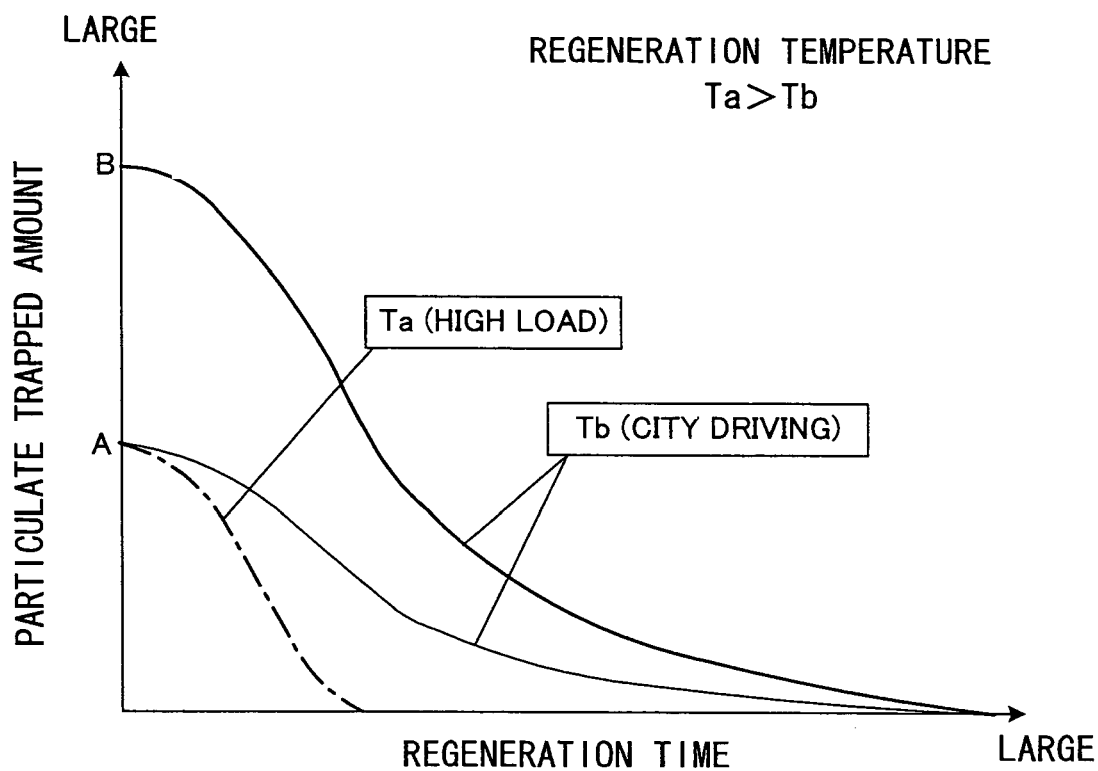
FIG. 3 is a graph showing a time variation of a trapped amount of exhaust gas particulates for various regeneration temperatures.

FIG. 3 shows the time-dependent variation of the trapped amount of exhaust gas particulates from start to end of regeneration. Referring to FIG. 3, the relation between the trapped amount of exhaust gas particulates when filter regeneration starts and the time required for complete regeneration, can be understood. At a low regeneration temperature Tb which can be obtained under a relatively low load running condition corresponding to when the vehicle is travelling in an urban area, a longtime is required for complete regeneration regardless of the initial trapped amount (A or B). At a higher regeneration temperature Ta (Ta>Tb) which is obtained under a relatively high load running condition corresponding to when the vehicle is traveling at high speed, complete regeneration can be performed efficiently in a short time as shown by the dot-and-dash line in FIG. 3.

Figure 4:
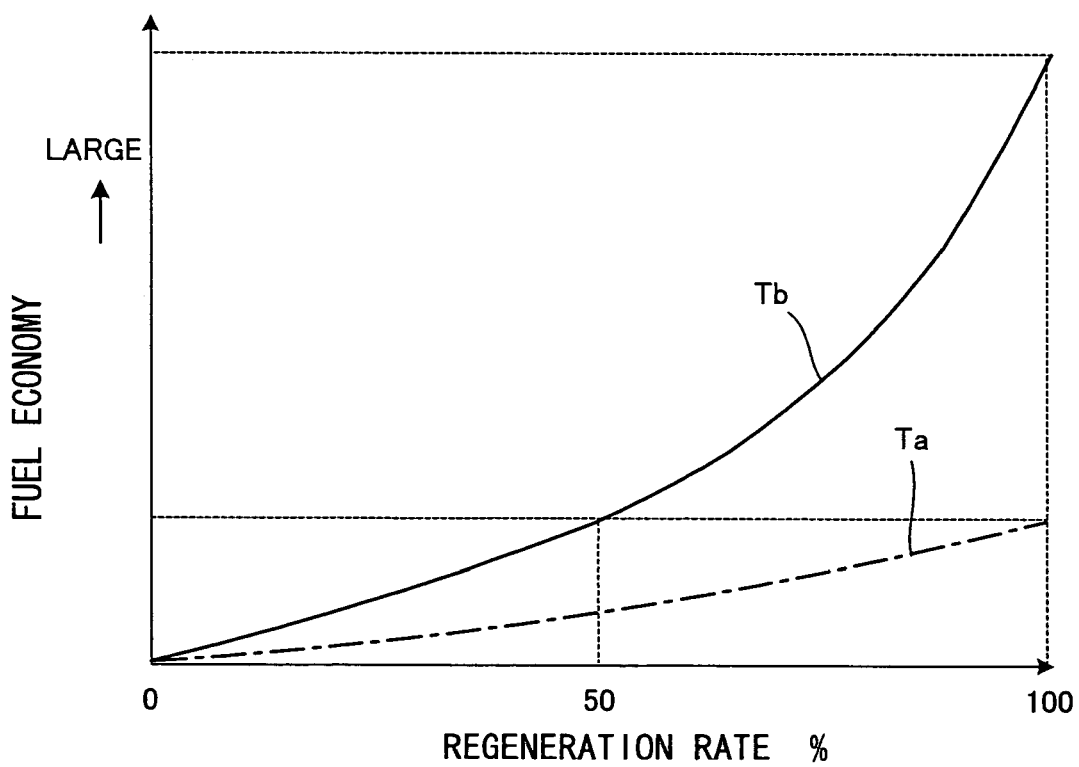
FIG. 4 is a graph showing a relation between regeneration efficiency and fuel cost-performance.

On the other hand, FIG. 4 shows the relation between fuel cost-performance during regeneration, and regeneration rate. The regeneration rate represents the particulate amount removed by regeneration as a percentage, and it is zero when regeneration starts and 100% when regeneration is completed. At the regeneration temperature Tb when the vehicle is traveling in an urban area, fuel cost-performance remarkably increases in a region where the regeneration rate is 50% or more. On the other hand, at the regeneration temperature Ta when the vehicle is travelling at high speed, regeneration is efficiently performed from a regeneration rate of 50% to a complete regeneration of 100%.

According to this invention, since regeneration is mainly performed under the high load condition, fuel cost-performance impairment is suppressed as seen from the characteristics of FIG. 3 and FIG. 4. As shown in FIG. 4, under low load, the regeneration efficiency is impaired in a region where the regeneration efficiency is 50% or more, so in this aspect, regeneration is performed more efficiently by setting the first reference value A to approximately 50%, and setting the second reference value B to about twice the first reference value A.

Figure 2:
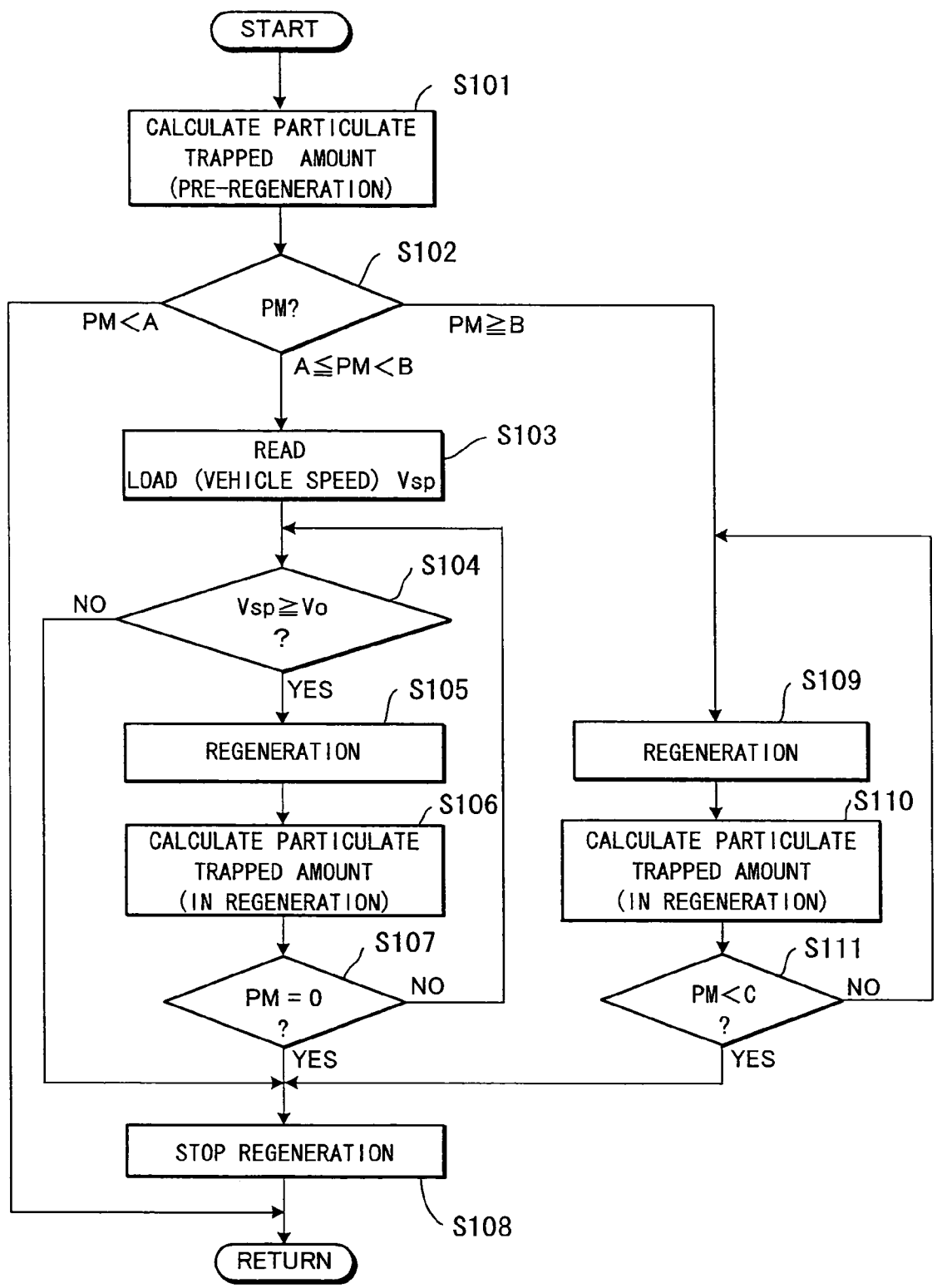
FIG. 2 is a flowchart showing a regeneration control routine relating to one embodiment.

The reference value C used for determining the end of regeneration processing in the low load condition in the step S111 of FIG. 2, may be set to the first reference value A or above. In this case, if the vehicle is traveling at high speed immediately after regeneration processing of the steps S109–S111 is terminated, regeneration processing to achieve complete regeneration is continued via the determination of the step S104. Consequently, a regeneration which makes effective use of the high load running condition can be performed.

Further, if the first reference value A and second reference value B are set small, regeneration can start in a high load engine running condition even when the trapped amount of exhaust gas particulates is relatively small. For this reason, by actively using the high load engine running condition which has little effect on fuel cost-performance and which easily permits raising exhaust gas temperature, the trapped amount of particulates in the filter can be maintained low. On the other hand, when the engine load is low and fuel cost-performance is tending to increase due to raising the exhaust gas temperature, regeneration is first performed when the trapped amount of particulates in the exhaust gas is equal to or more than the second reference value B (relatively high). Therefore, the fuel cost-performance to regenerate the filter can be reduced.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

The entire contents of Japanese Patent Applications P2003-328739 (filed Sep. 19, 2003) are incorporated herein by reference.

What is claimed is:

1. A regeneration control device which regenerates a filer for trapping particulate matter in exhaust gas from an engine, the regeneration control device burning the particulate matter trapped in the filter by raising an exhaust gas temperature, the regeneration control device comprising:

a load detection sensor which detects an engine load, and a microcomputer having first and second reference values which are respectively criterion values in determining an initiation of regeneration of the filter, the microcomputer being programmed to:

compute a trapped amount of particulate matter trapped by the filter based on an engine running state including an engine load;

compare the computed trapped amount with the first reference value and second reference value;

start engine control to adjust the exhaust gas temperature for regeneration of the filter, when the computed trapped amount is equal to or more than the first reference value and less than the second reference value, and the detected load is equal to or more than a reference load, and continue the engine control to adjust the exhaust gas temperature for regeneration of the filter until the trapped amount of particulate matter reaches a minimum value; and start engine control to adjust the exhaust gas temperature for regeneration of the filter regardless of the detected load, when the computed trapped amount is equal to or more than the second reference value, and continue the engine control to adjust the exhaust gas temperature until the trapped amount of particulate matter reaches a third reference value above the first reference value.

2. The regeneration control device as defined in claim 1, wherein the microcomputer is further programmed to:

stop engine control to adjust the exhaust gas temperature when the engine is in a predetermined low load running state including idle running.

3. The regeneration control device as defined in claim 1, wherein the second reference value is set to be approximately twice the first reference value.

4. The regeneration control device as defined in claim 1, wherein the load detection sensor detects the traveling speed of the vehicle in which the engine is installed.

5. The regeneration control device as defined in claim 1, wherein an engine system including the engine is provided with one of a fuel injector, turbocharger, exhaust gas recirculation device, throttle valve and auxiliary device, and the engine control to adjust the exhaust gas temperature is any one of fuel injection timing control, fuel injection amount control, opening control of the variable nozzle of the turbocharger, exhaust gas recirculation control, intake air amount control and auxiliary device load control.

6. regeneration control device as defined in claim 1, wherein the microcomputer is further programmed to:

start the engine control to adjust the exhaust gas temperature, when the computed trapped amount is equal to or more than the first reference value and less than the second reference value, and the detected load is equal to or more than a reference load, and stop the engine control to adjust the exhaust gas temperature when the detected load is less than the reference load; and start engine control to adjust the exhaust gas temperature regardless of the detected load, when the computed trapped amount is equal to or more than the second reference value, and continue the engine control to adjust the exhaust gas temperature until the trapped amount of particulate matter reaches a third reference value above the first reference value regardless of the detected load.

7. A regeneration control device which regenerates a filter for trapping particulate matter in exhaust gas from an engine, the regeneration control device burning the particulate matter trapped in the filter by raising an exhaust gas temperature, the regeneration control device comprising:
- means for providing first and second reference values which are respectively criterion values in determining an initiation of regeneration of the filter;
- means for detecting an engine load;
- means for computing a trapped amount of particulate matter trapped by the filter based on an engine running state including an engine load;
- means for comparing the computed trapped amount with the first reference value and second reference value;
- means for starting engine control to adjust the exhaust gas temperature for regeneration of the filter, when the computed trapped amount is equal to or more than the first reference value and less than the second reference value, and the detected load is equal to or more than a reference load, and continuing the engine control to adjust the exhaust gas temperature for regeneration of the filter until the trapped amount of particulate matter reaches a minimum value; and
- means for starting engine control to adjust the exhaust gas temperature for regeneration of the filter regardless of the detected load, when the computed trapped amount is equal to or more than the second reference value, and continue the engine control to adjust the exhaust gas temperature until the trapped amount of particulate matter reaches a third reference value above the first reference value.

8. A regeneration method for regenerating a filter, which traps particulate matter in exhaust gas from an engine, by burning the particulate matter trapped in the filter by raising an exhaust gas temperature, the regeneration method comprising the steps of:
- providing first and second reference values which are respectively criterion values in determining an initiation of regeneration of the filter;
- detecting an engine load;
- computing a trapped amount of particulate matter trapped by the filter based on an engine running state including an engine load;
- comparing the computed trapped amount with the first reference value and second reference value;
- starting engine control to adjust the exhaust gas temperature for regeneration of the filter, when the computed trapped amount is equal to or more than the first reference value and less than the second reference value, and the detected load is equal to or more than a reference load, and continuing the engine control to adjust the exhaust gas temperature for regeneration of the filter until the trapped amount of particulate matter reaches a minimum value; and
- starting engine control to adjust the exhaust gas temperature for regeneration of the filter regardless of the detected load, when the computed trapped amount is equal to or more than the second reference value, and continuing the engine control to adjust the exhaust gas temperature until the trapped amount of particulate matter reaches a third reference value above the first reference value.

* * * * *